US008249801B2

(12) United States Patent
Sakai et al.

(10) Patent No.: US 8,249,801 B2
(45) Date of Patent: Aug. 21, 2012

(54) NAVIGATION DEVICE AND MAP DATA UPDATING METHOD THEREOF

(75) Inventors: Toru Sakai, Nukata Aichi (JP); Norihiro Nakamura, Toyokawa Aichi (JP); Isao Moribe, Okazaki Aichi (JP); Hironobu Sugimoto, Aichi (JP); Tomoki Kodan, Nagoya Aichi (JP)

(73) Assignees: Aisin AW Co., Ltd (JP); Toyota Jidosha Kabushiki Kaisha (JP)

( * ) Notice: Subject to any disclaimer, the term of this patent is extended or adjusted under 35 U.S.C. 154(b) by 109 days.

(21) Appl. No.: 12/525,005

(22) PCT Filed: Mar. 31, 2008

(86) PCT No.: PCT/JP2008/056835
§ 371 (c)(1),
(2), (4) Date: Jun. 29, 2010

(87) PCT Pub. No.: WO2008/123617
PCT Pub. Date: Oct. 16, 2008

(65) Prior Publication Data
US 2010/0274472 A1     Oct. 28, 2010

(30) Foreign Application Priority Data
Mar. 30, 2007   (JP) .................. 2007-093899

(51) Int. Cl.
*G01C 21/00* (2006.01)
*G01S 19/00* (2010.01)

(52) U.S. Cl. .................. 701/408; 342/357.2

(58) Field of Classification Search .............. 701/23–26, 701/200–203, 208, 212; 340/988–996; 342/357.2–357.23
See application file for complete search history.

(56) References Cited

U.S. PATENT DOCUMENTS

| 5,684,989 | A | 11/1997 | Nissato | 395/617 |
| 6,980,907 | B2 | 12/2005 | Umezu et al. | |
| 7,490,006 | B2 | 2/2009 | Sekine et al. | |
| 7,912,639 | B2* | 3/2011 | Atarashi | 701/450 |
| 2005/0049784 | A1 | 3/2005 | Ikeuchi et al. | |
| 2005/0114018 | A1 | 5/2005 | Umezu et al. | 701/208 |
| 2006/0190166 | A1* | 8/2006 | Ohira et al. | 701/208 |
| 2006/0190507 | A1 | 8/2006 | Sekine et al. | 707/205 |
| 2007/0143014 | A1 | 6/2007 | Sekine et al. | 701/211 |
| 2007/0156759 | A1 | 7/2007 | Sekine et al. | 707/104.1 |

FOREIGN PATENT DOCUMENTS

| JP | 2000-036097 | 2/2000 |
| JP | 2002-005669 | 1/2002 |
| JP | 2002-318532 | 10/2002 |

* cited by examiner

*Primary Examiner* — James Trammell
*Assistant Examiner* — Muhammad Shafi
(74) *Attorney, Agent, or Firm* — Bacon and Thomas, PLLC

(57) ABSTRACT

When updating means 24 for performing a differential update on map data M using update data U performs an update on the map data M using update data U stored on a recording medium R, update data U having section identification information that matches the section identification information of the map data M and a later update version than the update version of the map data M are extracted from the plurality of update data U stored on the recording medium R, and a differential update is performed on the map data M using the extracted update data U.

13 Claims, 11 Drawing Sheets

UPDATE VERSION=0512

UPDATE VERSION=0602  (a)+(d)

UPDATE VERSION=0612  (b)+(e)

UPDATE VERSION=0602

UPDATE VERSION=0612

(a)+(e)

NAVIGATION DEVICE AND MAP DATA UPDATING METHOD THEREOF

TECHNICAL FIELD

The present invention relates to a navigation device that has a map database storing a plurality of map data divided into predetermined update units and is constituted to be capable of performing a differential update on the respective map data using update data, and a map data updating method of the navigation device.

BACKGROUND ART

It is desirable that map data used in a navigation device accurately express the current conditions of roads, facilities and so on, which vary constantly. Hence, in a well-known system, new map data are distributed via a communication network, and the map data in a map database of a navigation device are updated using the distributed map data. In another well-known system, in order to manage the update condition of the map data on the navigation device side when updating the map data in this manner, identification symbols (map numbers) are allocated respectively to the plurality of map data stored in the map database, and update versions (version numbers) are allocated in accordance with the respective identification symbols of the map data (see Japanese Patent Application Publication H04-349575, for example).

In this type of system, when the update version of map data on a server device side is later than the update version of the corresponding map data on the navigation device side and the two sets of map data have been allocated with the same identification symbol, the latest map data is transmitted to the navigation device from the server device. Upon reception of the newest map data, the navigation device updates the map data in the map database by replacing the old map data with the latest map data. Also at this time, the navigation device performs management by modifying the update version of the map data to the latest update version.

DISCLOSURE OF THE INVENTION

In a conventional system such as that described above, when updating is performed on map data allocated with a single identification symbol as update subject, all of the latest map data relating to the update subject map data are transmitted to the navigation device. Therefore, when complicated map data such as the map data of a navigation device are to be updated, the amount of data transmitted for updating becomes large, leading to increases in the communication time and communication cost.

The amount of data transmitted to the navigation device may be reduced by transmitting the update content of the update subject map data as update data constituted by difference information indicating the difference between the pre-update map data and post-update map data. However, this update data difference information is information relating to the difference between the update data and the map data before being updated by the update data, and therefore, when the update subject map data are not in the pre-update condition assumed by the update data, a differential update cannot be performed appropriately. More specifically, for example, when map data are updated by update data having an older update version than the current update version of the map data, or when map data having an update version that is older than the update version of the update data by two or more versions are updated by the update data, the map data cannot be updated appropriately.

This problem is particularly likely to arise when the navigation device is constituted to be capable of executing two updating methods, namely a method of updating map data using update data received via a communication network and a method of updating the map data using update data read from a recording medium. More specifically, when the navigation device is constituted in this manner, a situation in which only a part of the plurality of map data stored in the map database is updated to the latest update version by the update data received via the communication network may occur such that both map data that have been updated to the latest update version and map data still having an old update version coexist in the map database. Here, the aforementioned recording medium typically provides a large number of navigation devices with shared content, and therefore the recording medium stores update data in all of the update versions from a certain time in the past to the most recent in relation to the plurality of map data in the map database. Hence, when map data having different update versions coexist as described above and a differential update is performed on a plurality of map data all at once using the plurality of update data stored on the recording medium such that a mechanical differential update is performed on the respective map data by applying all of the update data stored on the recording medium, a case in which a differential update using the update data is performed on map data that are not in the pre-update condition assumed by the update data, as described above, may occur. As a result, it is impossible to update each of the plural map data in the map database appropriately.

The present invention has been designed in consideration of the problems described above, and it is an object thereof to provide a navigation device which is capable of obtaining update data for differentially updating map data via both a communication network and a recording medium such that when a differential update is performed on a plurality of map data in a map database all at once using a plurality of update data stored on the recording medium in a situation where update versions of the plurality of map data may differ from each other, the differential update can be performed appropriately on each of the plural map data by appropriately extracting the update data to be applied to the respective map data, and also to provide a map data updating method of the navigation device.

A navigation device according to the present invention for achieving the object described above includes: a map database storing a plurality of map data that are divided into predetermined update units and respectively include identification information indicating an identification symbol and version information indicating a current update version; receiving means for receiving, via a communication network, update data that are generated in update units corresponding to the update units of the map data and include difference information indicating an update content of update subject map data as a difference with pre-update map data, identification information indicating the identification symbol of the update subject map data, and version information indicating a post-update update version; reading means for reading the update data from a recording medium storing a plurality of the update data; and updating means for performing a differential update on the map data using the update data received by the receiving means or read by the reading means. When performing an update on the map data using the update data stored on the recording medium, the updating means extracts the update data having identification information that matches the identification information of the map data and a later update version than the update version of the map data from the plurality of update data stored on the recording medium, and perform a differential update on the map data using the extracted update data.

According to this featured constitution, a differential update can be performed on the map data using the update data received by the receiving means or read by the reading means, and therefore the update data relating to map data having a high update necessity can be obtained frequently via the communication network, and a plurality of map data can be updated together using the plurality of update data stored on the recording medium. Hence, map data having a high update necessity, such as map data having a high usage frequency, can be updated frequently and thereby maintained at the latest update version, while map data having a low usage frequency can be updated using the recording medium, enabling reductions in communication time and communication cost. Accordingly, the plurality of map data stored in the map database can be updated appropriately in accordance with the update necessity thereof. Further, by employing differential update data as the update data, the data size of the update data can be suppressed. As a result, the communication time and communication cost required to receive the update data when performing an update via the communication network can be reduced, and when the recording medium is used, a large quantity of update data can be stored on a single recording medium.

Furthermore, in this featured constitution, when the map data are updated using the update data stored on the recording medium, update data having identification information that matches the identification information of the map data and a later update version than the update version of the map data are extracted from the plurality of update data stored on the recording medium. Therefore, in a case where the update versions of the plurality of map data stored in the map database are different to each other following an update performed on only a part of the plurality of map data in the map database using the update data received by the receiving means, for example, the update data to be applied to the respective map data can be extracted appropriately even when a differential update is performed on a plurality of map data all at once using the plurality of update data stored on the recording medium, and as a result, the differential update can be performed appropriately on the plurality of map data.

Here, when a plurality of update data having identification information that matches the identification information of the map data and a later update version than the update version of the map data exist, the updating means preferably perform the differential update on the map data on the basis of the version information of the respective update data such that the update data are applied in order from the update data having the oldest update version.

According to this constitution, when a plurality of update data having different update versions exist in relation to a single set of map data from among the plurality of map data stored in the map database, the content of the update data can be reflected in the map data in order from the oldest update version, and therefore a differential update can be performed appropriately on the map data.

Further, the update unit is preferably a section obtained by dividing a map into predetermined regions, and the identification symbol is preferably a section ID allocated to each section.

According to this constitution, map data divided into sections obtained by dividing a map into predetermined regions are stored in the map database of the navigation device. Therefore, the map data can be updated in each section according to the update necessity.

Further, the version information of the update data preferably indicates an identical update version in relation to a plurality of update data generated at an identical generation time but having different update subject map data.

According to this constitution, the update version indicated by the version information of the update data expresses the time at which the update data was generated, and therefore the time to which the map data has been updated by the update data can be grasped easily on the basis of the update version indicated by the version information thereof.

Further, in addition to the version information, the update data preferably include past version information indicating a past update version of the update data relating to the update subject map data.

If a plurality of update data generated at the same generation time are provided with the same update version, as described above, a case in which the update versions of a plurality of update data having the same single set of map data as an update subject but different update versions become non-consecutive may arise when update data are not generated in relation to some of the update versions of the map data due to there being no change in the actual condition of the map data. According to this constitution, information regarding the past update version of update data having the same map data as an update subject can be obtained on the basis of the past version information of the update data. Thus, the pre-update update version of the map data assumed by the update data can be grasped. As a result, erroneous application of the update data to the map data can be prevented even when the update data become non-consecutive, as described above, and therefore the differential update can be performed correctly.

Further, the recording medium preferably stores update data having a plurality of map data included in a predetermined geographical area as update subjects in all update versions generated within a predetermined time period.

According to this constitution, all of the plurality of map data included in the predetermined geographical area can be updated together to the condition of the latest update version generated within the predetermined time period using the recording medium. Therefore, an update can be performed appropriately on all of the map data in a wide geographical area all at once, thereby avoiding the extremely large amount of time and communication cost required to transmit the update data via the communication network.

In a map data updating method for a navigation device according to the present invention, when a differential update is performed on map data using update data received via a communication network or read from a recording medium in a navigation device having a map database that stores a plurality of the map data divided into predetermined update units and respectively including identification information indicating an identification symbol and version information indicating a current update version, the update data are generated in update units corresponding to the update units of the map data so as to include difference information indicating an update content of update subject map data as a difference with pre-update map data, identification information indicating the identification symbol of the update subject map data, and version information indicating a post-update update version, and when an update is performed on the map data by reading the update data from the recording medium storing a plurality of the update data, update data having identification information that matches the identification information of the map data and a later update version than the update version of the map data are extracted from the plurality of update data stored on the recording medium, and a differential update is performed on the map data using the extracted update data.

According to this featured constitution, a differential update can be performed on the map data using the update data received via the communication network or read from the recording medium, and therefore the update data relating to map data having a high update necessity can be obtained frequently via the communication network, and a plurality of map data can be updated together using the plurality of update data stored on the recording medium. Hence, map data having a high update necessity, such as map data having a high usage frequency, can be updated frequently and thereby maintained at the latest update version, while map data having a low usage frequency can be updated using the recording medium, enabling reductions in communication time and communication cost. Accordingly, the plurality of map data stored in the map database can be updated appropriately in accordance with the update necessity thereof. Further, by employing differential update data as the update data, the data size of the update data can be suppressed. As a result, the communication time and communication cost required to receive the update data when performing an update via the communication network can be reduced, and when the recording medium is used, a large quantity of update data can be stored on a single recording medium.

Furthermore, in this featured constitution, when the map data are updated using the update data stored on the recording medium, update data having identification information that matches the identification information of the map data and a later update version than the update version of the map data are extracted from the plurality of update data stored on the recording medium. Therefore, in a case where the update versions of the plurality of map data stored in the map database are different to each other following an update performed on only a part of the plurality of map data in the map database using the update data received via the communication network, for example, the update data to be applied to the map data can be extracted appropriately even when a differential update is performed on a plurality of the map data all at once using the plurality of update data stored on the recording medium, and as a result, the differential update can be performed appropriately on the plurality of map data.

BEST MODES FOR CARRYING OUT THE INVENTION

Figure 1:
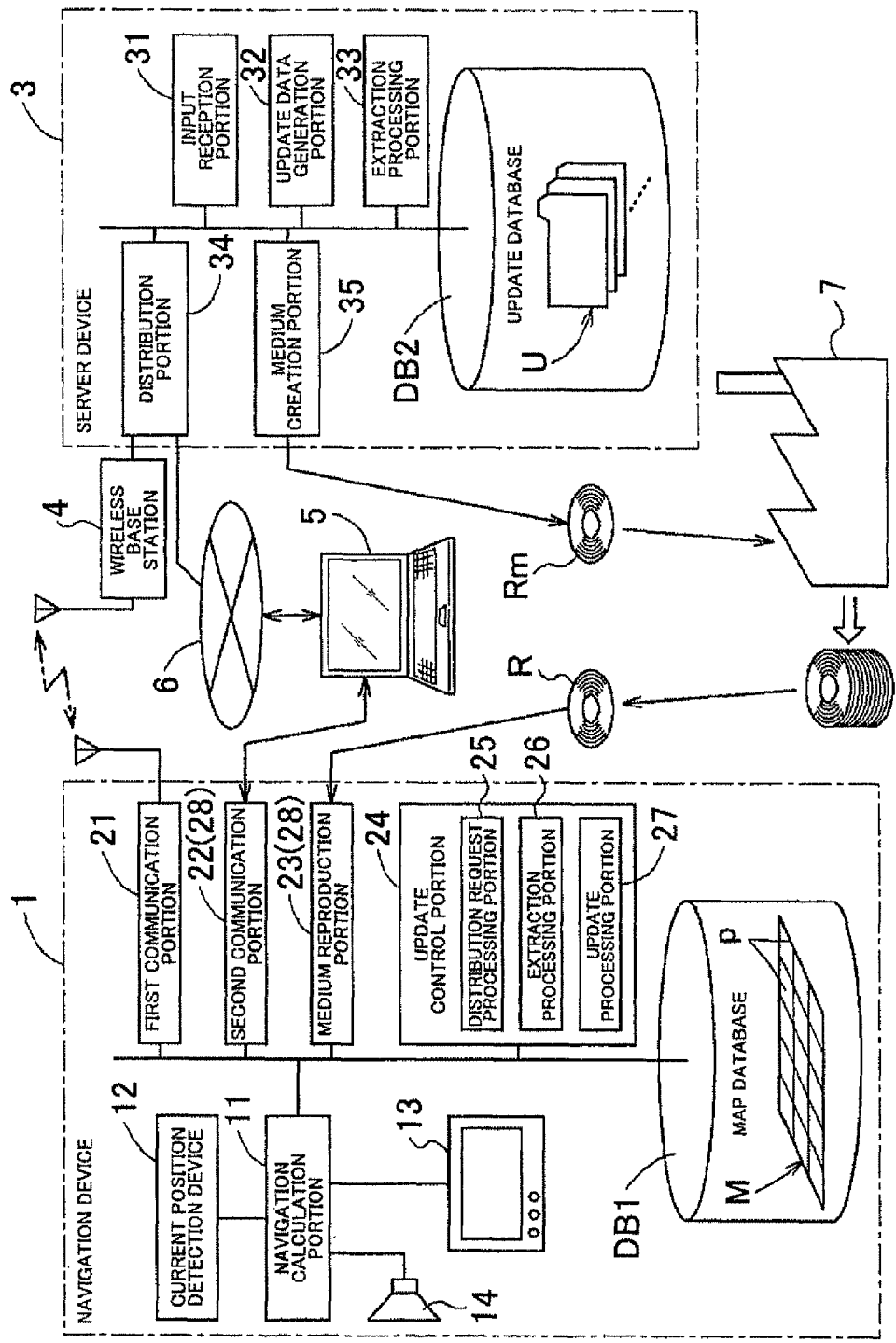
FIG. 1 is a block diagram showing in pattern form the overall constitution of a data updating system including a navigation device according to an embodiment of the present invention.

An embodiment of the present invention will be described on the basis of the drawings. FIG. 1 is a block diagram showing in pattern form the overall constitution of a data updating system including a navigation device 1 according to this embodiment. The data updating system according to this embodiment is constituted by a navigation device 1 constituted to be capable of receiving provided update data U and updating map data M stored in a map database DB1, and a server device 3 that generates the update data U, stores the update data U in an update database DB2, and distributes the update data U appropriately. Here, the various portions of the navigation device 1 and server device 3 are structured such that function portions for performing various processing on input data are installed in hardware, software (programs) or both, with a calculation processing device such as a CPU serving as a core member. Further, the map database DB1 of the navigation device 1 and the update database DB2 of the server device 3 are provided with devices having a hardware constitution including a rewritable recording medium such as a hard disk drive or flash memory and driving means for driving the recording medium. The constitution of each portion of the navigation device 1 and server device 3 according to this embodiment will now be described.

1. Constitutions for Realizing Navigation Functions of Navigation Device

As shown in FIG. 1, the navigation device 1 is constituted to be capable of realizing typical navigation functions. For this purpose, the navigation device 1 includes the map database DB1, a navigation calculation portion 11, a current position detection device 12, a display input device 13, and a voice output device 14.

The map database DB1 is a database storing a plurality of map data M that are referenced by the navigation calculation portion 11 to realize navigation functions. In this embodiment, the map database DB1 stores a plurality of map data M divided into the predetermined sections p. Here, the sections p are obtained by dividing a map into predetermined regions. Preferred examples of the sections p include sections defined by distance or area, such as rectangular regions of a predetermined size, for example 2.5 [km$^2$] in terms of real world distance, sections divided into administrative district units, or sections defined by landscape. Together, collection of the map data M in each of the plurality of sections p constitutes map data for the whole of Japan, for example. Accordingly, in this embodiment the section p corresponds to the "update unit" of the present invention.

Figure 2:
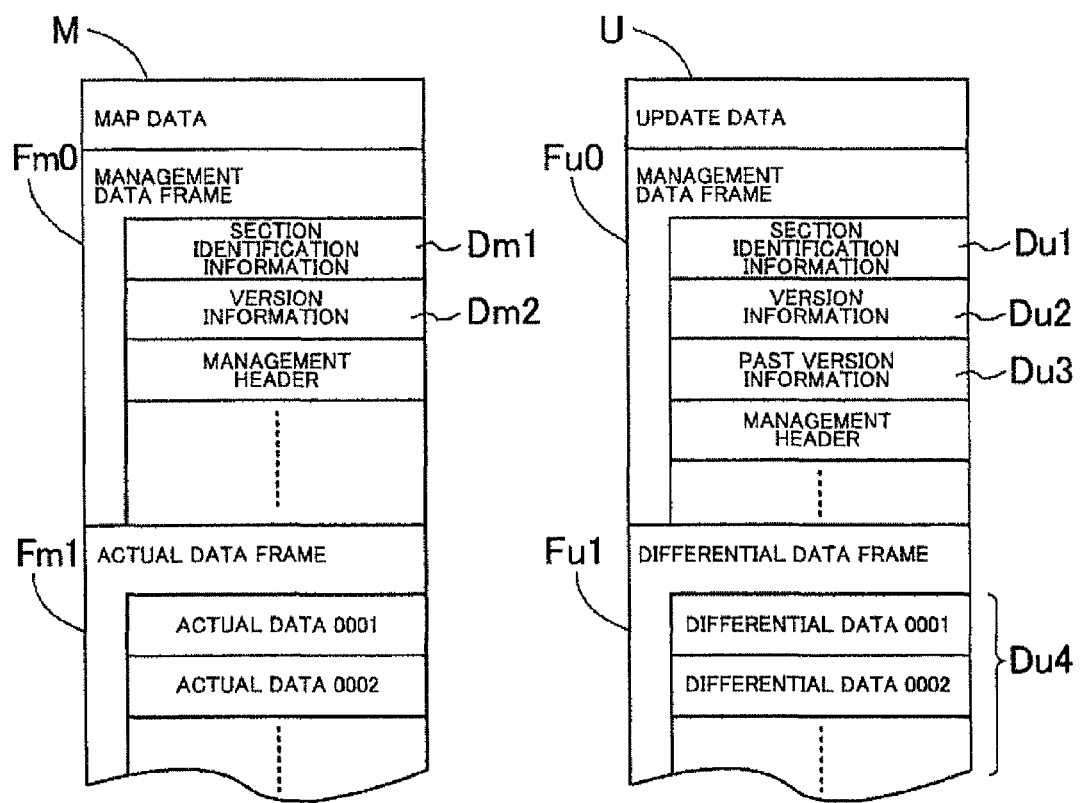
FIG. 2 is a view showing a specific example of the data structure of A map data and B update data in a single section.

Further, a section ID is allocated to the map data M in each section p as an identification symbol such that each set of map data M includes section identification information Dm1 serving as identification information expressing the section ID. The map data M in each section p also include version information Dm2 indicating the current update version, i.e. an update condition following updating by the update data U. FIG. 2A is a view showing a specific example of the data structure of the map data M in each section p. As shown in the drawing, the each set of map data M is provided with a management data frame Fm0 at the top of the data. The section identification information Dm1 and version information Dm2 are stored in the management data frame Fm0. Note that a management header, which is constituted by management data such as the storage location of the actual data within an actual data frame Fm1, and so on are also stored in the management data frame Fm0. The actual data frame Fm1 is provided after the management data frame Fm0, and actual data 0001, 0002, . . . constituting the map data M are stored therein.

Returning to FIG. 1, the navigation calculation portion 11 performs calculation processing for realizing the navigation functions of the navigation device 1. Specific examples of these functions include map display of the periphery of a current position or a specified position, map matching for correcting the current position on a road on the map, route searching from a departure point to a destination, route guidance to the destination, and searching for a geographical location such as a destination.

The current position detection device 12 is a device for detecting the present position of the navigation device 1. Accordingly, although not shown in the drawing, the current position detection device 12 includes a GPS receiver, a bearing sensor, a distance sensor, and so on, for example. On the basis of information obtained by these components, the current position detection device 12 obtains information such as coordinates indicating the present position and an advancement bearing, and outputs this information to the navigation calculation portion 11. On the basis of the current position information detected by the current position detection device 12 and the map data M in the map database DB1, the navigation calculation portion 11 performs navigation processing such as current position display, map matching, and route searching.

The display input device 13 includes a display unit such as a liquid crystal display, and an input unit provided integrally with the display unit such as a touch panel or an operating switch. The voice output device 14 is constituted by a speaker, an amplifier, and so on. The display unit of the display input device 13 and the voice output device 14 are controlled and operated by the navigation calculation portion 11 to perform display, voice output and so on such as current position display, route calculation between two points, course guidance, and destination searching. The input unit of the display input device 13 receives operation input from a user and outputs the content thereof to the navigation calculation portion 11. Note that a remote controller, not shown in the drawing, may be provided together with or in place of the input unit of the display input device 13.

2. Constitution for Updating Map Data of Navigation Device

Figure 3:
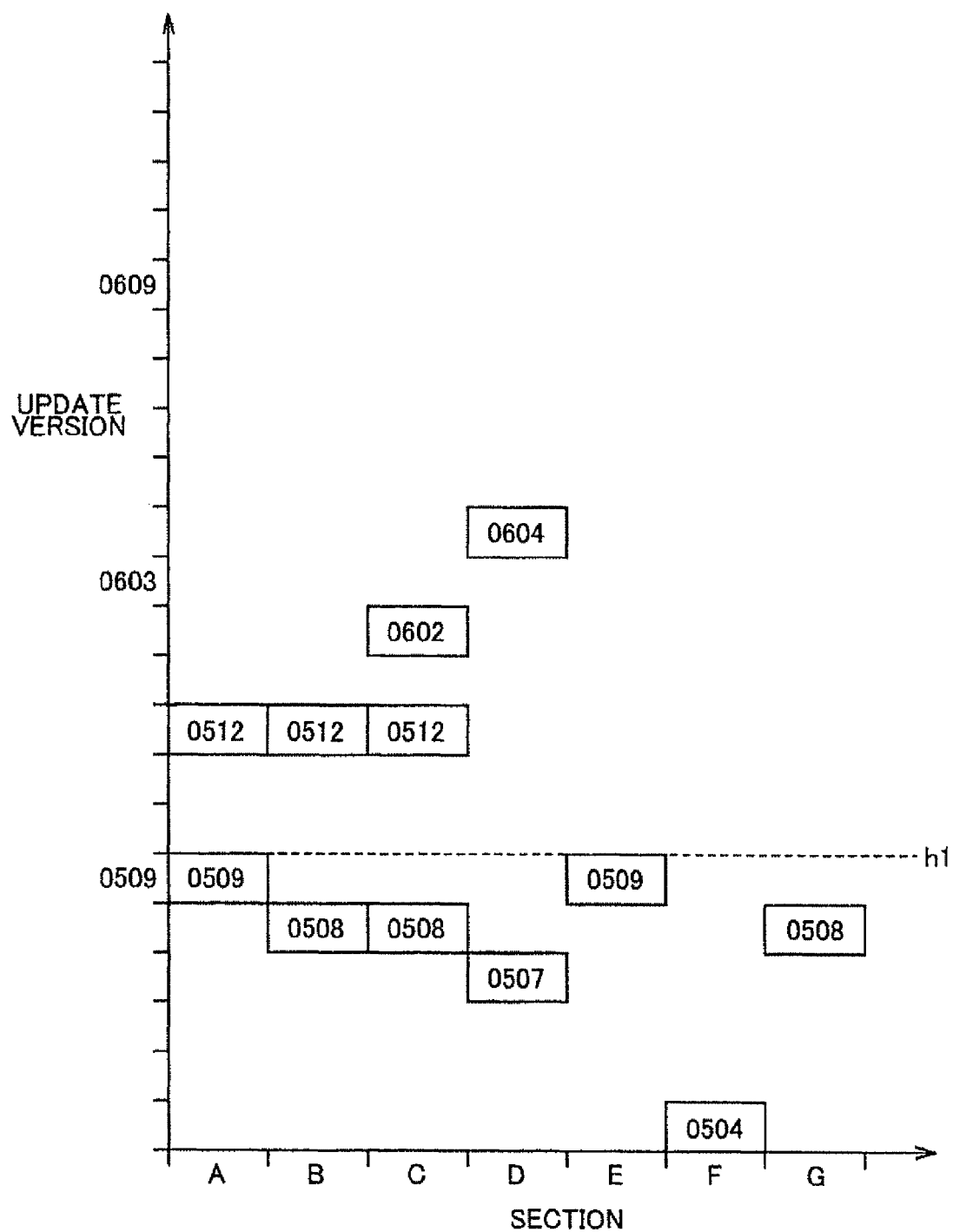
FIG. 3 is a view showing the condition of map data in a map database following updating by update data.
Figure 4:
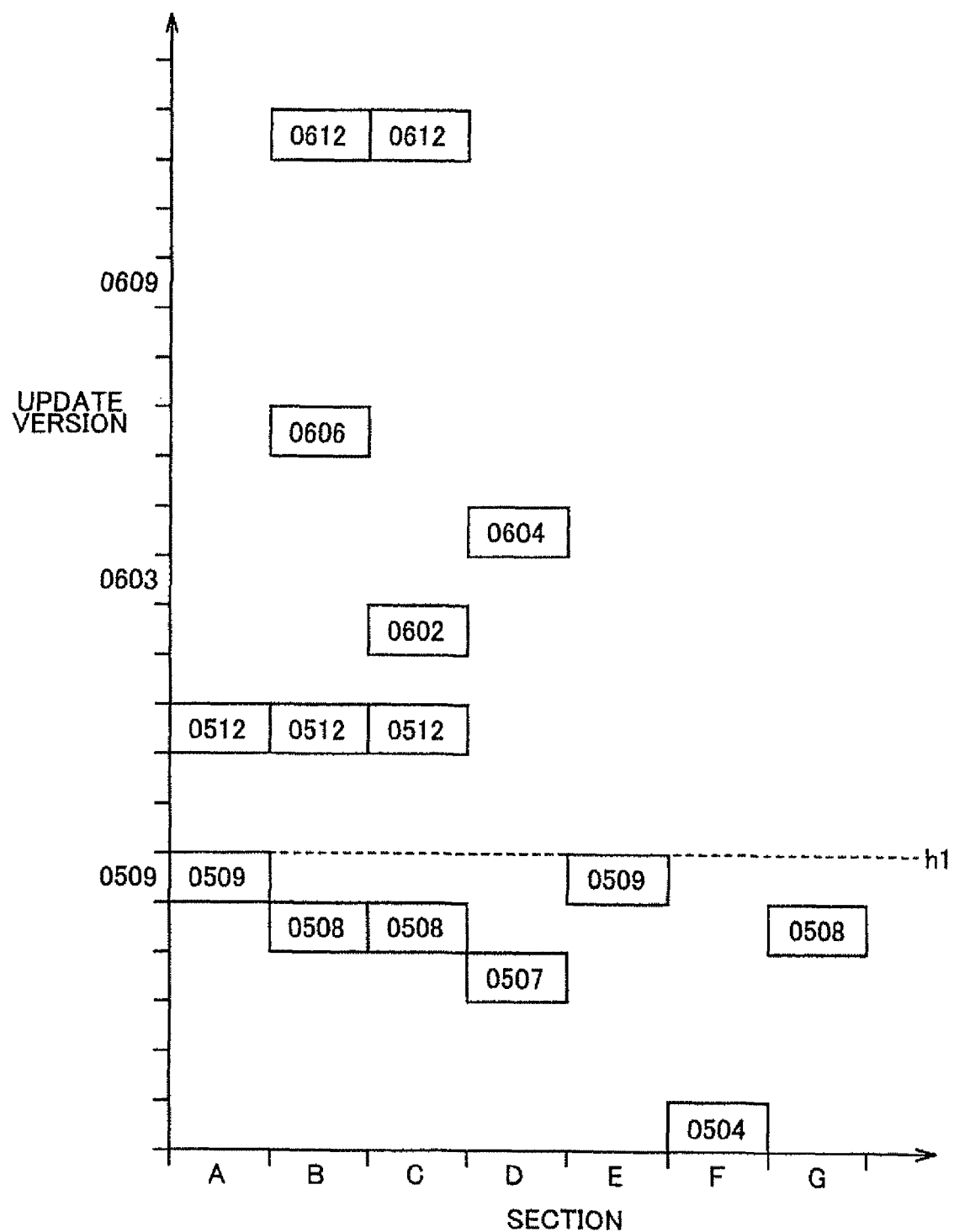
FIG. 4 is a view showing the condition of the map data in the map database following updating by the update data.
Figure 5:
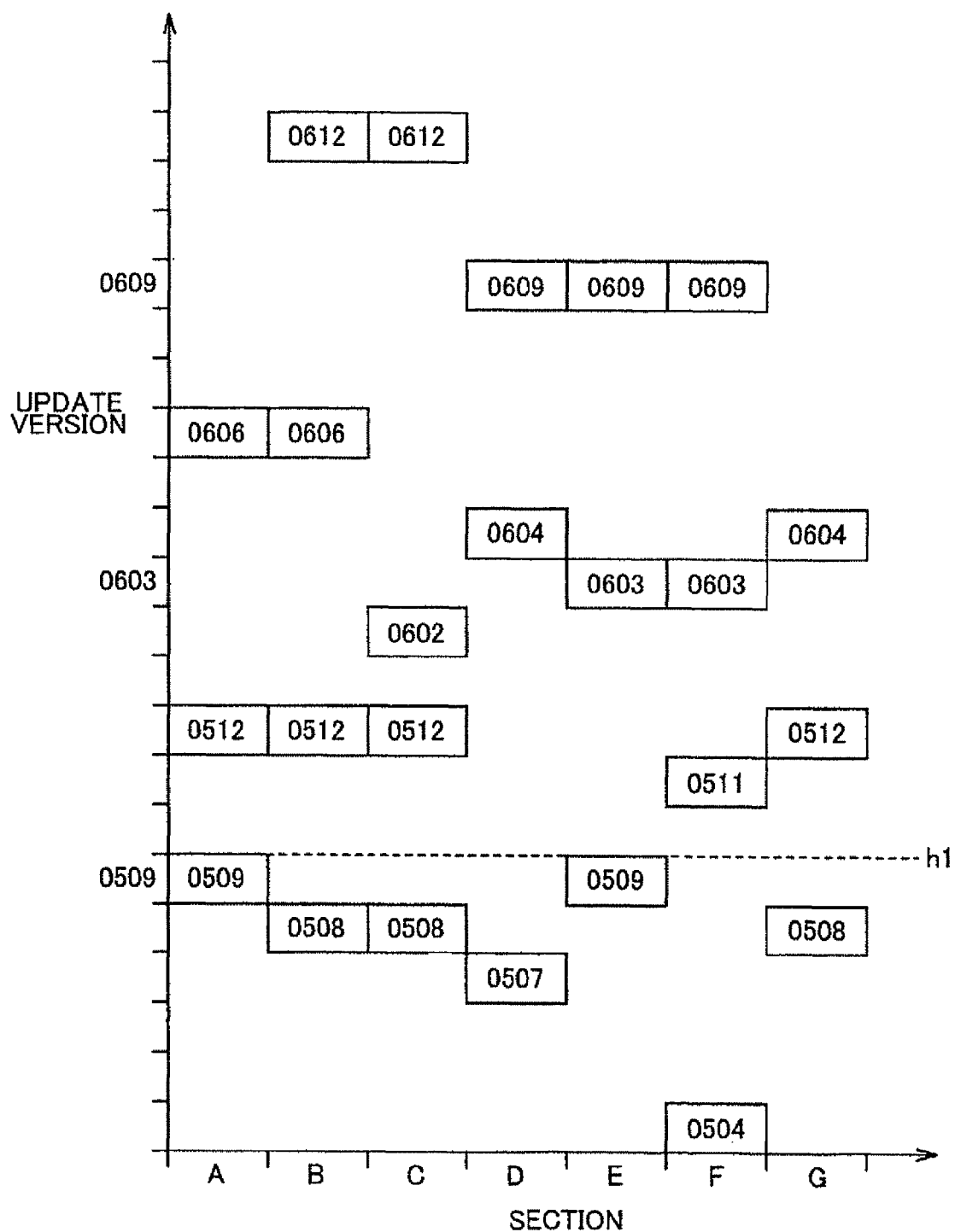
FIG. 5 is a view showing the condition of the map data in the map database following updating by the update data.
Figure 6:
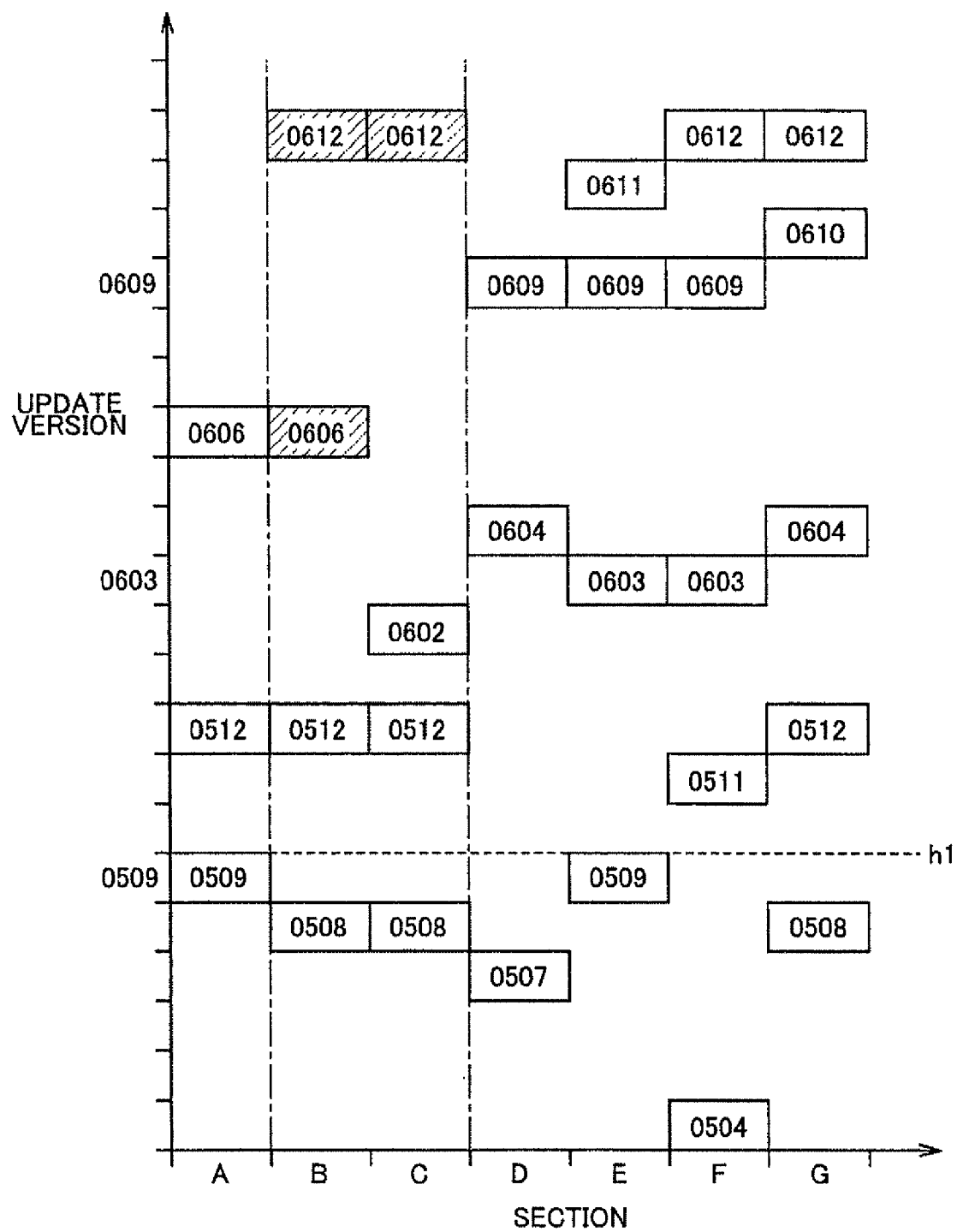
FIG. 6 is a view showing update data stored in an update database of a server device.
Figure 7:
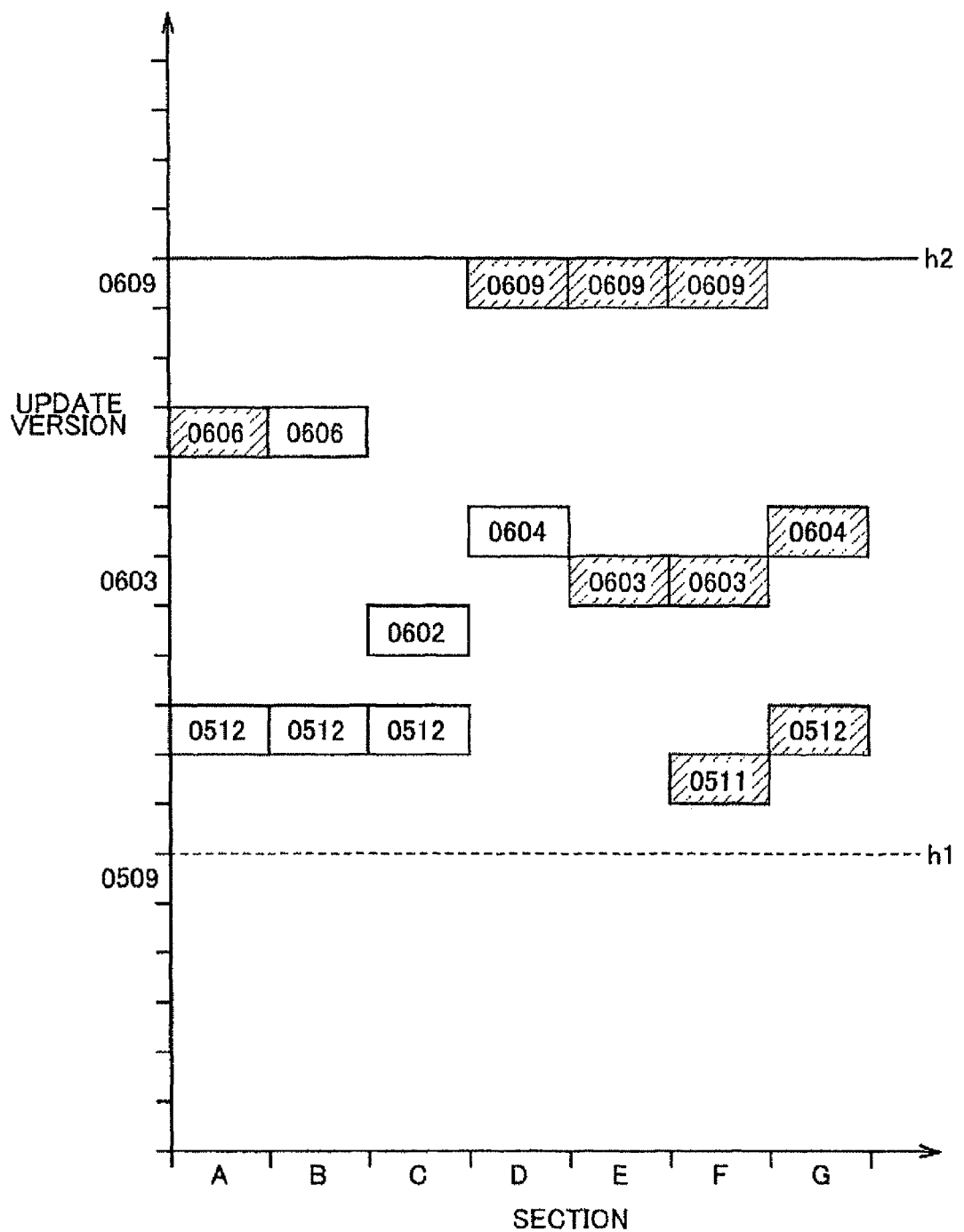
FIG. 7 is a view showing update data stored on a recording medium.
Figure 8A:
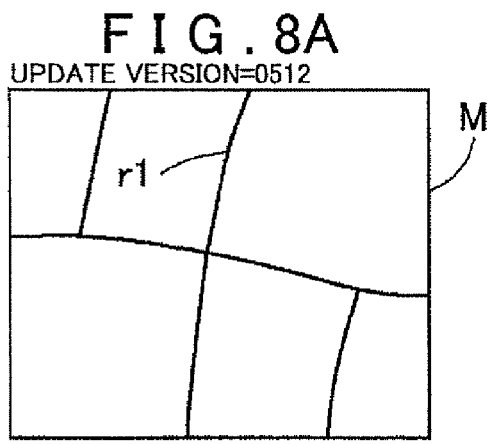
FIG. 8 is an illustrative view illustrating the specific content of difference information included in the update data.
Figure 8B:
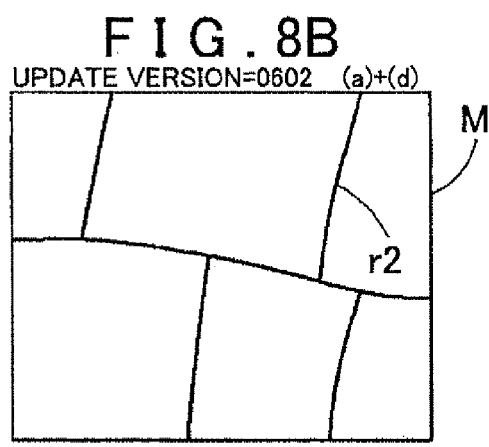
Figure 8C:
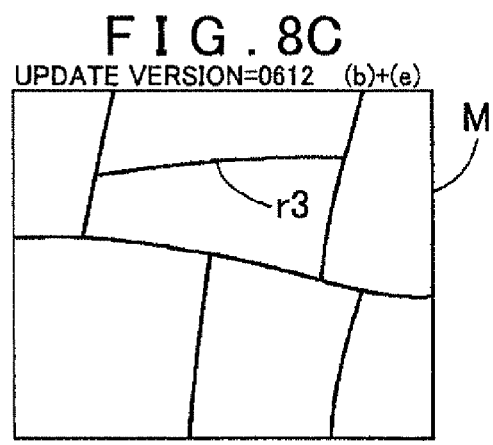
Figure 8D:
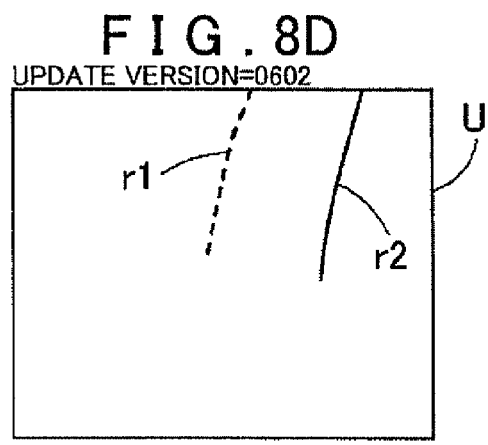
Figure 8E:
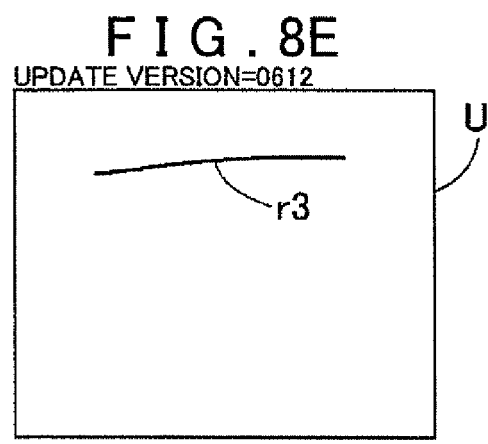
Figure 8F:
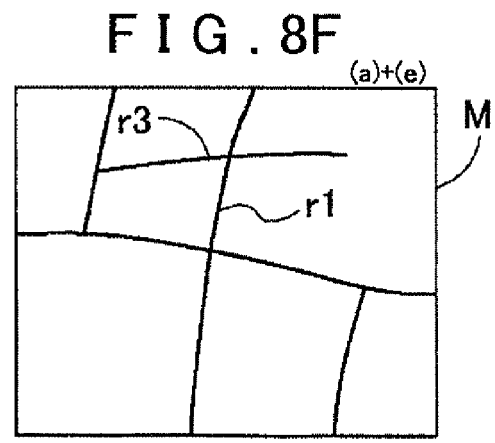

The navigation device 1 is constituted to be capable of performing a differential update on the map data M stored in the map database DB1 using the update data U. For this purpose, the navigation device 1 includes a first communication portion 21, a second communication portion 22, a medium reproduction portion 23, and an update control portion 24. Further, the update control portion 24 includes a distribution request processing portion 25, an extraction processing portion 26, and an update processing portion 27. Note that in the following description, FIGS. 3 through 7 will be referred to where appropriate. These drawings are graphs in which seven sections p, from a section A to a section G, of the plurality of map data M stored in the map database DB1, are disposed along the abscissa axis, and the update version of the update data U having the map data M in each section p as an update subject are disposed along the ordinate axis. Here, the update version on the ordinate steadily increases in newness toward the top of the drawing. Further, the plurality of rectangular frames in the graphs respectively indicate the update data U, and the numbers in the rectangular frames indicate the update version of the update data U. Further, the rectangular frames below a horizontal broken line h1 drawn between the update versions "0509" and "0510" in the drawings indicate the update version of the map data M at the time of shipping of the navigation device 1. As will be described below, of these drawings, FIGS. 3 to 5 show the transition of the update condition of the map data M in the map database DB1 following updating by the update data U, FIG. 6 shows the update data U stored in the update database DB2 of the server device 3, and FIG. 7 shows the update data U stored on a recording medium R.

The first communication portion 21 performs wireless communication with a wireless base station 4. Thus, the first communication portion 21 transmits and receives data to and from the server device 3 via the wireless base station 4. More specifically, the first communication portion 21 transmits distribution request data of the update data U to the server device 3, and receives the update data U from the server device 3. As a wireless communication method between the first communication portion 21 and the wireless base station 4, a well-known communication network such as a cellular telephone network or a wireless LAN (Local Area Network) may be used, for example. In this embodiment, the first communication portion 21 constitutes "receiving means" of the present invention.

The second communication portion 22 performs wired communication with an update terminal 5 belonging to the user or the vendor of the navigation device 1. Thus, the second communication portion 22 is capable of reading update data U that are transmitted to the update terminal 5 via a communication network 6 such as the Internet and stored on a hard disk in the update terminal 5 or another recording medium. Here, a personal computer or the like may be used as the update terminal 5, for example. Various communication methods such as well-known wired or wireless communication methods may be employed as the method of communication between the second communication portion 22 and the update terminal 5.

The medium reproduction portion 23 reproduces an easily portable recording medium (to be referred to hereafter as "recording medium R") storing the update data U such as an optical disk or a magnetic disk, and reads the update data U. A reproduction device or the like for reproducing an optical disk such as a CD (compact disk) or DVD may be used as the medium reproduction portion 23, for example. In this example, the recording media R, which are mass-produced in a factory 7, are distributed to each user of the navigation device 1 on the basis of a master medium Rm created in a medium creation portion 35 of the server device 3, to be described below, and reproduced in the medium reproduction portion 23. Further, although not shown in the drawing, the recording medium R may preferably be created using the update terminal 5 by recording the update data U stored on the hard disk or other recording medium of the update terminal 5 on a writable recording medium such as an optical disk or a magnetic disk. Likewise in this case, the recording medium R created by the update terminal 5 is reproduced by the medium reproduction portion 23, whereby the update data U are read.

As described above, the second communication portion 22 reads the update data U stored on the hard disk or other recording medium of the update terminal 5, and the medium reproduction portion 23 reads the update data U stored on the recording medium R. Hence, in this embodiment, both the second communication portion 22 and the medium reproduction portion 23 constitute "reading means 28" of the present invention. Note that in the following description, a case in which the update data U are read from the recording medium R in the medium reproduction portion 23 will be described as a main example, but absolutely identical processing is performed in a case where the update data U are read from the recording medium in the update terminal 5 by the second communication portion 22.

The update control portion 24 performs differential update processing on the map data M stored in the map database DB1 using the update data U received by the first communication portion 21 or the update data U read from the recording medium R by the medium reproduction portion 23. More specifically, in this embodiment, the update control portion 24 is constituted to be capable of executing two types of map data M update processing, namely communication update processing, in which the map data M are differentially updated using the update data U received from the server device 3 via the wireless base station 4, and medium update processing, in which the map data M are differentially updated using the update data U read by reproducing the recording medium R in the medium reproduction portion 23. For this purpose, the update control portion 24 includes the distribution request processing portion 25, the extraction processing portion 26, and the update processing portion 27, as noted above. In this embodiment, the update control portion 24 constitutes "updating means" of the present invention. The constitution of each portion of the update control portion 24 will be described below, but first, the constitution of the update data U according to this embodiment will be described in detail.

The update data U are updating data for differentially updating the each of map data M in the map database DB1, and are generated for each section p in accordance with the sections p of the map data M. In this embodiment, the update data U are generated in an update data generation portion 32 of the server device 3. Each set of update data U includes difference information Du4 indicating the update content of the map data M in the update subject section p, section identification information Du1, version information Du2, and past version information Du3. FIG. 2B is a view showing a specific example of the data structure of the update data U in each section p. As shown in the drawing, each set of update data U is provided with a management data frame Fu0 at the top of the data. The section identification information Du1, version information Du2, and past version information Du3 are stored in the management data frame Fu0.

Here, the section identification information Du1 is information for identifying the section p of the map data M that are to be updated by the corresponding update data U, and is identification information expressing the section ID of the update subject map data M. In other words, map data M having an identical section ID to the section ID indicated by the section identification information Du1 as the section identification information Dm1 are the update subject of the update data U.

The version information Du2 is information expressing the update version of the map data M following updating by the update data U. Here, the update version indicated by the version information Du2 is set such that a plurality of update data U generated at the same generation timing but relating to different update subject map data M have the same update version. In this example, the update version is set to express the generation timing of the update data U. More specifically, in this example the update version expresses the year and month in which the update data U were generated, and therefore the upper two digits of the update version correspond to the lower two digits of the generation year of the update data U according to the Western calendar, while the lower two digits of the update version correspond to the generation month of the update data U. For example, the update version of the update data U generated in December 2006 is "0612". Further, the update version indicated by the version information Du2 serves as the update version of the map data M following updating by the corresponding update data U. Hence, with respect to a section C shown in FIGS. 3 and 4, for example, when map data M having an update version "0602", as shown in FIG. 3, are updated using update data U having an update version "0612", as shown in FIG. 4, the update version of the map data M following the update becomes "0612". This will be described in further detail below.

The past version information Du3 is information expressing a past update version of the update data U relating to the update subject map data M. In this example, information expressing the update version of update data U immediately preceding the subject update data U is stored as the past version information Du3. Hence, when the map data M are differentially updated in sequence by three sets of update data U having the update versions "0512", "0602", "0612", for example, when the map data M in the section C shown in FIG. 4 are updated, the past version information Du3 of the update data U having the update version "0612" indicates the update version "0602", and the past version information Du3 of the update data U having the update version "0602" indicates the update version "0512". On the basis of the past version information Du3, the pre-update update version of the map data M assumed by the update data U can be grasped even when the update versions become non-consecutive after the update version expressing the generation timing of the update data U has been set, as in this example, and as a result, the erroneous application of past update data U to the map data M can be prevented, and normal differential updating can be ensured.

Note that a management header, which is constituted by management data such as the storage location of the various difference data constituting the difference information Du4 within a difference data frame Fu1, and so on are also stored in the management data frame Fu0, as shown in FIG. 2B. The difference data frame Fu1 is provided after the management data frame Fu0, and difference data 0001, 0002, . . . constituting the difference information Du4 are stored in the difference data frame Fu1. Here, the difference information Du4 is information expressing the update content of the map data M in the update subject section p, which is to be updated in accordance with actual variations in the condition of roads, facilities and so on, as the difference with the pre-update map data M of the section p.

FIG. 8 is an illustrative view illustrating the specific content of the difference information Du4. This drawing shows examples of variation in the map data M resulting from a differential update when the map data M in the section C shown in FIG. 5 are subjected to processing. FIGS. 8A to 8C respectively show variation in the map data M when the update data U having the update version "0602" (FIG. 8D) and the update data U having the update version "0612" (FIG. 8E) are applied in sequence to the map data M having the update version "0512". More specifically, of the examples shown in FIG. 8, the update data U having the update version "0602", shown in FIG. 8D, include difference information Du4 indicating that a road r1 is to be deleted and a road r2 is to be added. Hence, when a differential update is performed by applying the update data U having the update version "0602", shown in FIG. 8D, to the map data M having the update version "0512", shown in FIG. 8A, the map data M are updated to map data M having the update version "0602", shown in FIG. 8B. Further, the update data U having the update version "0612", shown in FIG. 8E, include difference information Du4 indicating that a road r3 is to be added. Hence, when a differential update is performed by applying the update data U having the update version "0612", shown in FIG. 8E, to the map data M having the update version "0612", shown in FIG. 8B, the map data M are updated to map data M having the update version "0612", shown in FIG. 8C. The update data U express the actual content of the difference information Du4, and therefore, when a differential update is performed by applying the update data U having the update version "0612", shown in FIG. 8E, to the map data M having the update version "0512", shown in FIG. 8A, for example, information relating to an intersection between the road r1 which is nonexistent in reality and the new road r3, an intersection between the road r2 which exists in reality and the new road r3, and so on cannot be processed appropriately, as shown in FIG. 8F. As a result, a differential update cannot be performed correctly on the map data M. Note that in FIG. 8, only the roads of the map data M are shown for the purpose of simplification, but in reality, the map data M include various information such as intersections and various types of facilities.

The distribution request processing portion 25 issues an update data U distribution request to the server device 3 via the first communication portion 21 and the wireless base station 4. Typically, the communication time and communication cost of receiving the update data U through wireless communication are higher than when the update data U are read from the recording medium R. Therefore, in this embodiment, instead of issuing an update data U distribution request in relation to the map data M for all of the sections p stored in the map database DB1, the distribution request processing portion 25 sets one or more sections p requesting the update data U as request sections, and issues an update data U distribution request to the server device 3 in relation to these request sections alone. At this time, the distribution request processing portion 25 generates distribution request data including information for specifying the set request sections and the current update version of the map data M in each request section, and transmits the distribution request data to the server device 3. Here, the request section is determined by selecting a section p having a high update necessity from among the plurality of sections p of the map data M stored in the map database DB1. Thus, map data having a high update necessity can be updated frequently by the update data U and maintained at the newest update version. A section p having a high frequency of use or a high possibility of use by the navigation calculation portion 11 corresponds to such section p having a high update necessity. Examples of such sections p include a section p including the periphery of a position registered as the residence of the user of the navigation device 1, a section p including the periphery of the current position detected by the current position detection device 12, a section p including the periphery of a position specified by the user, and when a destination has been set, sections p including the periphery of the destination and the periphery of a set route to the set destination, for example. The high update necessity sections p may also be preferably selected according to the passage history of the section p, indicating the number of times the current position included in the section p has been passed through, the number of points included in the section p that have been registered to facilitate point searches, the number of times a point included in the section p has been searched for as a destination or the like, and so on, for example.

The distribution request data generated in the distribution request processing portion 25 and transmitted to the server device 3 include the section identification information Dm1 and version information Dm2 relating to the map data M in the one or more request sections determined by the distribution request processing portion 25. When the update condition of the map data M in the map database DB1 is as shown in FIG. 3, for example, and the sections B and C are set as the request sections by the distribution request processing portion 25, the distribution request data are generated as data including two sets of section identification information Dm1 expressing the section IDs of section B and section C, respectively, and two sets of version information Dm2 expressing the current update version "0512" of the section B and the current update version "0602" of the section C, respectively. Having received the distribution request data, the server device 3 employs an extraction processing portion 33 to extract the update data U for updating the map data M in the request sections, or in other words, the update data U having a later update version than the update version of the map data M in the request sections, from the update database DB2 on the basis of the section identification information Dm1 and version information Dm2 included in the distribution request data. A distribution portion 34 then transmits the extracted update data U to the navigation device 1. FIG. 6 is a view showing the update subject sections p and update versions of the update data U stored in the update database DB2 of the server device 3 according to this example. The extraction processing portion 33 extracts the update data U corresponding to the shaded rectangular frames in FIG. 6, or more specifically the update data U in the section B having the later update versions "0606" and "0612" than the update version "0512" and the update data U in the section C having the later update version "0612" than the update version "0602", from the update database DB2 on the basis of the content of the distribution request data described above, and reads the extracted update data U. Note that reception of the update data U and differential update processing (communication update processing) of the map data M accompanying an update data U distribution request by the distribution request processing portion 25 will be described in detail below on the basis of the flowchart shown in FIG. 9.

When the recording medium R is reproduced by the medium reproduction portion 23 and the map data M are updated using the update data U stored on the recording medium R, the extraction processing portion 26 performs processing to extract the update data U to be used in a differential update of the map data M stored in the map database DB1 from the plurality of update data U stored on the recording medium R. At this time, the extraction processing portion 26 compares the section identification information Dm1 and version information Dm2 of the plurality of map data M stored in the map database DB1 with the section identification information Du1 and version information Du2 of the plurality of update data U stored on the recording medium R, and extracts update data U having section identification information Du1 that matches the section identification information Dm1 of the map data M and an update version indicated by the version information Du2 that is newer than the update version indicated by the version information Du2 of the map data M from the plurality of update data U stored on the recording medium R. In other words, the extraction processing portion 26 reads the section identification information Dm1 and version information Dm2 of the plurality of map data M stored in the map database DB1, reads the section identification information Du1 and version information Du2 of the plurality of update data U stored on the recording medium R, and compares the two. The extraction processing portion 26 then extracts the update data U for updating the map data M in the subject section p, i.e. the update data U having a newer update version than the update version of the map data M, from the recording medium R.

In this embodiment, the recording medium R stores update data U having the plurality of map data M included in a predetermined geographical area as update subjects in all of the update versions generated over a predetermined time period. Here, examples of the predetermined geographical area include a country such as Japan, a region such as the Kanto region or the Kinki region, and a prefectural unit such as Tokyo or Osaka. Further, the predetermined time period may be a time period corresponding to the distribution cycle of the recording medium R, for example, such as one year or three years. FIG. 7 is a view showing the update subject sections p and update versions of the update data U stored on the recording medium R according to this example. In the example shown in the drawing, the recording medium R stores update data U for updating the map data M in seven sections p from a section A to a section G in all of the update versions generated from October 2005 to September 2006 (between a horizontal broken line h1 and a horizontal line h2 in FIG. 7). In this example, this period corresponds to a period of one year following shipping of the navigation device 1. Here, when the update condition of the map data M stored in the map database DB1 is as shown in FIG. 4, the extraction processing portion 26 extracts and reads the update data U corresponding to the shaded rectangular frames in FIG. 7 as the update data U having later update versions than the respective sets of map data M, or more specifically all of the update data U stored on the recording medium R in all of the sections p from the section A to the section G having a later update version than the update version of the map data M in each section p of the map database DB1. Note that differential update processing (medium update processing) of the map data M accompanying the processing to extract the update data U from the recording medium R, performed by the extraction processing portion 26, will be described in detail below on the basis of the flowcharts shown in FIGS. 10 and 11.

The update processing portion 27 performs a differential update on the map data M stored in the map database DB1 using the update data U received by the first communication portion 21 from the server device 3 or the update data U extracted from the recording medium R and read by the extraction processing portion 26. Here, when a plurality of update data U having section identification information Du1 that matches the section identification information Dm1 of the map data M and an update version indicated by the version information Du2 that is later than the update version indicated by the version information Dm2 of the map data M exists, the update processing portion 27 performs a differential update on each set of map data M by applying the update data U in sequence from the update data U having the oldest update version on the basis of the version information Du2 provided in the update data U. At this time, the update processing portion 27 also performs processing to confirm an update sequence of the update data U on the basis of the past version information Du3 included in the update data U, thereby preventing the erroneous application of update data U to the map data M and ensuring that the differential update is performed correctly. Note that update processing of the map data M by the update processing portion 27 will be described in detail below on the basis of the flowchart shown in FIG. 12.

3. Constitution of Server Device

The server device 3 generates and distributes the update data U to be provided to the navigation device 1, or creates the recording medium R storing the update data U. For this purpose, the server device 3 includes the update database DB2, an input reception portion 31, an update data generation portion 32, the extraction processing portion 33, the distribution portion 34, and a medium creation portion 35, as shown in FIG. 1.

The update database DB2 is a database storing the update data U generated for provision to the navigation device 1. The update database DB2 stores update data U relating to the map data M in all of the sections p of the navigation device 1 in all of the update versions generated in the past. FIG. 6 is a view showing the update subject sections p and update versions of the update data U stored in the update database DB2 of the server device 3 according to this example. In the example shown in the drawing, the update database DB2 stores update data U for updating the map data M in seven sections p from the section A to the section G in all of the update versions generated between April 2005 and December 2006. Note that in this example, the number of sections is extremely limited for the purpose of simplification, but in reality, update data U relating to an extremely large number of sections p are stored in the update database DB2.

Returning to FIG. 1, the input reception portion 31 receives the input of map data M update information for generating the update data U. For this purpose, the input reception portion 31 includes various input devices such as a keyboard, a mouse, a touch panel, or a scanner, for example. The input reception portion 31 may also have a display device enabling the operator to confirm the update information input operation and so on. The update data generation portion 32 generates the update data U on the basis of the update information input from the input reception portion 31. The specific content of the generated update data U is as described above, and will not therefore be described here.

Upon reception of update data U distribution request data from the navigation device 1 via the distribution portion 34, the extraction processing portion 33 performs processing to extract the update data U to be transmitted to the navigation device 1 from the plurality of update data U stored in the update database DB2 based on the corresponding distribution request data. At this time, the extraction processing portion 33 compares the section identification information Dm1 and version information Dm2 of the map data M included in the distribution request data with the section identification information Du1 and version information Du2 of the plurality of update data U stored in the update database DB2, and extracts update data U having section identification information Du1 that matches the section identification information Dm1 and a newer update version than the map data M from the plurality of update data U stored in the update database DB2. In other words, the extraction processing portion 33 extracts the update data U for updating the map data M in the request sections, i.e. the update data U having a later update version than the update version of the map data M in the request sections, from the update database DB2 on the basis of the section identification information Dm1 and version information Dm2 included in the distribution request data. The update data U extraction processing performed by the extraction processing portion 33 is substantially identical to processing for extracting the update data U from the recording medium R, which is performed by the extraction processing portion 26 of the navigation device 1, except that the extraction subject sections p are limited to the range of the request sections.

The distribution portion 34 performs data transmission/reception by communicating with the first communication portion 21 of the navigation device 1 via the wireless base station 4 and communicating with the update terminal 5 via the communication network 6, such as the Internet. More specifically, the distribution portion 34 performs processing to receive the distribution request data from the navigation device 1 and transmit the update data U requested in the distribution request to the navigation device 1. Further, the distribution portion 34 performs processing to transmit all or a part of the update data U stored in the update database DB2 to the update terminal 5 in accordance with a request from the update terminal 5.

The medium creation portion 35 stores the update data U stored in the update database DB2 on an easily portable recording medium such as an optical disk or a magnetic disk, thereby creating a master medium Rm that serves as a source for the recording medium R to be provided to the navigation device 1. In this embodiment, the master medium Rm created by the medium creation portion 35 is sent to the factory 7. In the factory 7, recording media R are mass-produced by copying the master medium Rm and then distributed to the user of the navigation device 1. The content of the update data U stored on the master medium Rm is similar to the content of the update data U stored on the recording medium R described above.

Figure 9:
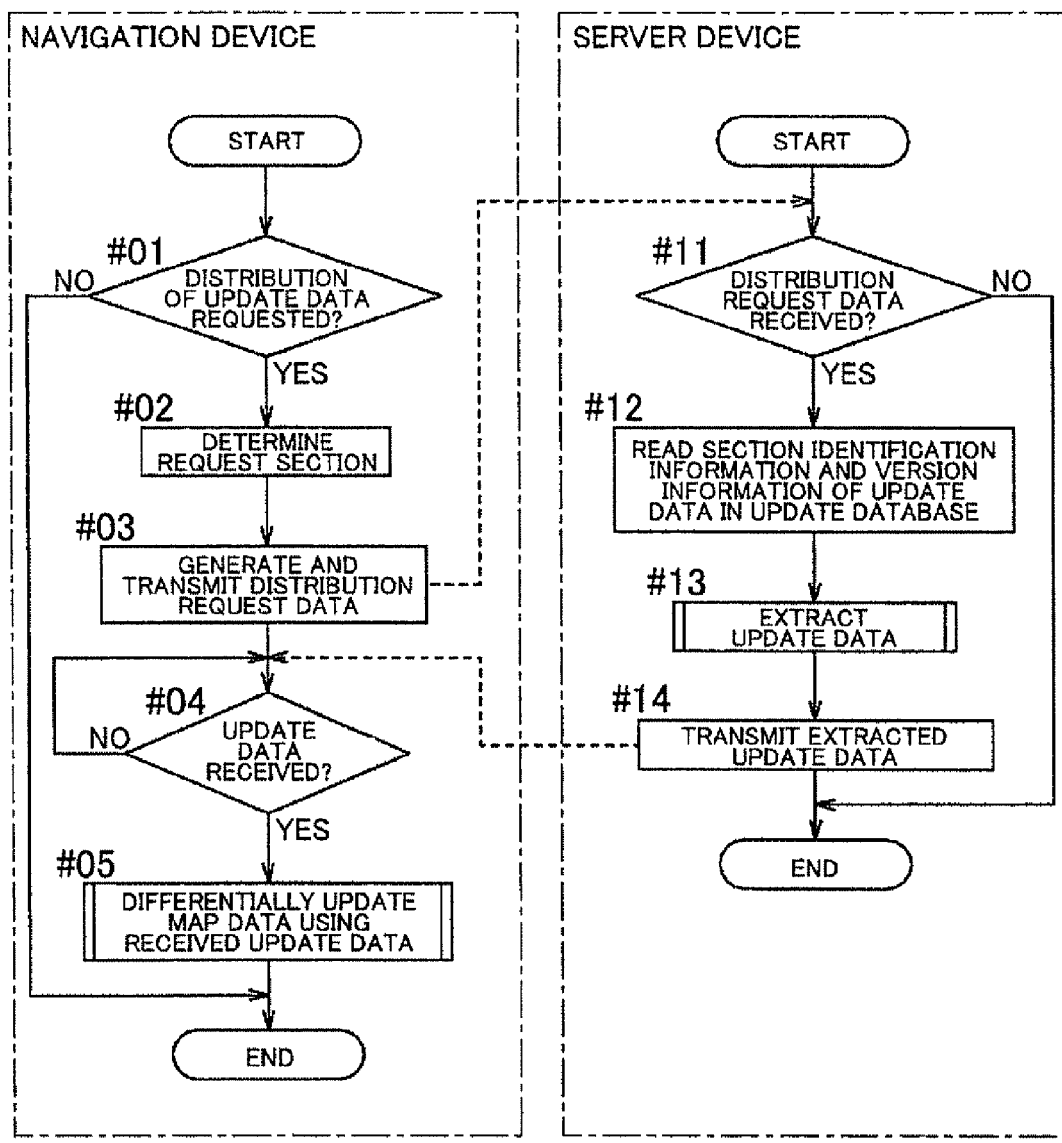
FIG. 9 is a flowchart showing a processing method for differentially updating the map data through communication with the server device.

4. Method of Performing Map Data Differential Update Processing Through Communication with Server Device Next, a method of performing update processing (communication update processing) on the map data M using update data U obtained through communication between the navigation device 1 and the server device 3 will be described. In this embodiment, the navigation device 1 issues an update data U distribution request to the server device 3, and performs a differential update on the map data M in the map database DB1 using the update data U received from the server device 3. FIG. 9 is a flowchart illustrating this communication update processing method. Here, a case in which the condition of the update data U in the update database DB2 of the server device 3 is as shown in FIG. 6 and a differential update is performed on the map data M upon reception of the update data U from the server device 3 such that the update condition of the map data M in the map database DB1 of the navigation device 1 shifts from the condition shown in FIG. 3 to the condition shown in FIG. 4 will be described as an example.

As shown in FIG. 9, first, the distribution request processing portion 25 of the navigation device 1 determines whether or not an update data U distribution request should be issued to the server device 3 (step #01). This determination as to whether or not to issue a distribution request may be performed on the basis of a time interval such as one month, for example, or on the basis of a map data M update request operation or the like performed by the user. When an update data U distribution request is to be issued (step #01: Yes), the distribution request processing portion 25 determines the request sections requesting the update data U (step #02). As described above, the request sections are determined by selecting one or more sections p having a high frequency of use or a high possibility of use by the navigation calculation portion 11 from among all of the sections p of the map data M stored in the map database DB1. Here, a case in which the section B and the section C are set as the request sections will be described as an example.

Next, the distribution request processing portion 25 generates distribution request data and transmits the generated data to the server device 3 via the first communication portion 21 (step #03). As described above, the distribution request data generated here include the section identification information Dm1 and version information Dm2 of the map data M in the one or more request sections. In this example, the map data M in the map database DB1 are in the update condition shown in FIG. 3, and therefore the distribution request data are generated as data including two sets of section identification information Dm1 expressing the section IDs of section B and section C, respectively, and two sets of version information Dm2 expressing the current update version "0512" of the section B and the current update version "0602" of the section C, respectively.

Next, when the one or more sets of update data U are received from the server device 3 (step #04), the update processing portion 27 performs a differential update on the map data M stored in the map database DB1 using the received update date U (step #05). In this example, as will be described below, the update data U corresponding to the shaded rectangular frames in FIG. 6, or more specifically the update data U in the section B having the update versions "0606" and "0612" and the update data U in the section C having the update version "0612", are transmitted from the server device 3. Accordingly, the update processing portion 27 of the navigation device 1 performs a differential update on the map data M by applying the respective update data U to the map data M in the respective update subject sections B and C. As a result, the update condition of the map data M stored in the map database DB1 shifts to the condition shown in FIG. 4. Note that this method of performing differential update processing on the map data M will be described in detail below on the basis of the flowchart shown in FIG. 12. Here, processing on the navigation device 1 side is terminated.

Meanwhile, when the distribution portion 34 of the server device 3 receives the update request data from the navigation device 1 (step #11: Yes), the extraction processing portion 33 reads the respective section identification information Du1 and version information Du2 of the plurality of update data U stored in the update database DB2 (step 412).

Next, the extraction processing portion 33 extracts the update data U to be transmitted to the navigation device 1 on the basis of the received distribution request data (step #13). At this time, the extraction processing portion 33 extracts the update data U for updating the map data M in the request sections, or in other words the update data U having later update versions than the update versions of the map data M in the request sections, from the update database DB2 on the basis of the section identification information Dm1 and version information Dm2 included in the distribution request data. In this example, the update subject sections p and update versions of the update data U stored in the update database DB2 are in the condition shown in FIG. 6. As described above, the request sections corresponding to the distribution request data are the section B and the section C, the current update version of the section B is "0512", and the current update version of the section C is "0602". Accordingly, the extraction processing portion 33 extracts the update data U corresponding to the shaded rectangular frames in FIG. 6, or more specifically the update data U in the section B having the later update versions "0606" and "0612" than the update version "0512" and the update data U in the section C having the later update version "0612" than the update version "0602", from the update database DB2. Here, the method of performing update data U extraction processing is substantially identical to processing (step #24 in FIG. 10) for extracting the update data U from the recording medium R in the navigation device 1, to be described below, except that the extraction subject sections p are limited to the range of the request sections. This method of performing processing to extract the update data U from the recording medium R will be described in detail below on the basis of the flowchart shown in FIG. 11. Next, the server device 3 transmits the one or more sets of update data U extracted in the step 413 to the navigation device 1 via the distribution portion 34 (step #14). Here, processing on the server device 3 side is terminated.

Figure 10:
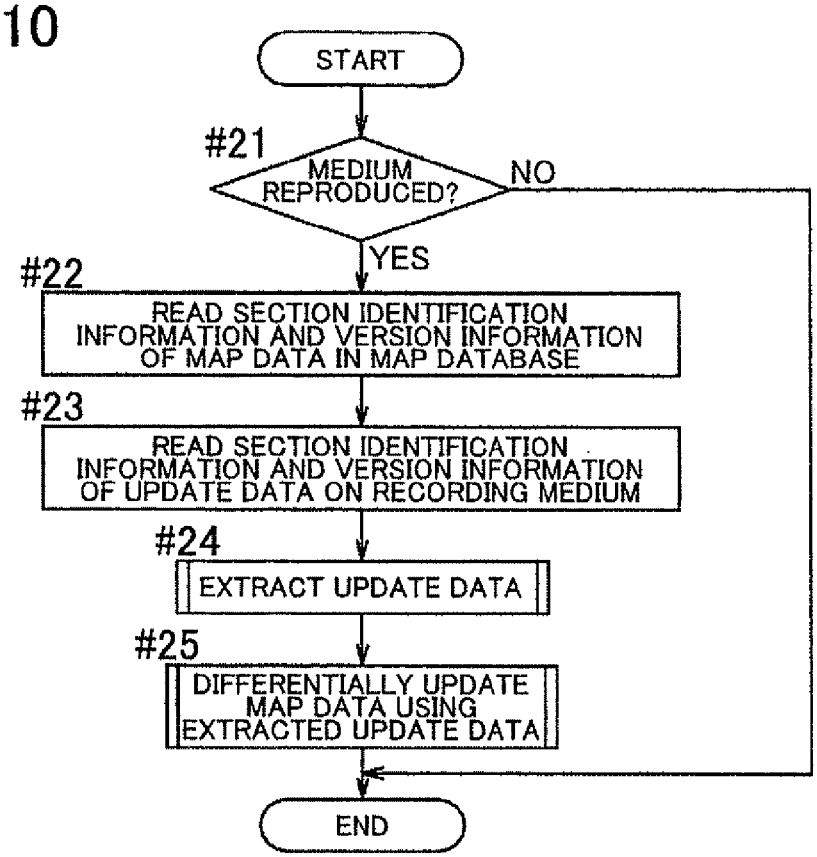
FIG. 10 is a flowchart showing a processing method for differentially updating the map data using update data read from the recording medium.

5. Method of Performing Differential Update Processing Using Update Data Read from Recording Medium Next, a method of performing update processing (medium update processing) on the map data M using update data U read from the recording medium R (recording medium) will be described. In this embodiment, the navigation device 1 extracts and reads the required update data U from the recording medium R, and performs a differential update on the map data M in the map database DB1 using the read update data U. FIG. 10 is a flowchart illustrating this medium update processing method. Here, a case in which the condition of the update data U on the recording medium R is as shown in FIG. 7 and a differential update is performed on the map data M using update data U read from the recording medium R such that the update condition of the map data M in the map database DB1 of the navigation device 1 shifts from the condition shown in FIG. 4 to the condition shown in FIG. 5 will be described as an example.

As shown in FIG. 10, first, when the recording medium R is reproduced in the medium reproduction portion 23 of the navigation device 1 (step #21: Yes), the extraction processing portion 26 reads the section identification information Dm1 and version information Dm2 of the plurality of map data M stored in the map database DB1 (step #22). In this example, as shown in FIG. 4, the section identification information Dm1 of each section p from the section A to the section G and the latest update version of each section p, i.e. the version information Dm2 indicating the update version in the rectangular frame positioned uppermost in each section p in FIG. 4, are read. Next, the extraction processing portion 26 reads the section identification information Du1 and version information Du2 of the plurality of update data U stored on the recording medium R using the medium reproduction portion 23 (step #23). In this example, the section identification information Du1 and version information Du2 relating to all of the update data U shown in FIG. 7, i.e. all of the update data U indicated by the rectangular frames in FIG. 7, are read.

Next, the extraction processing portion 26 compares the section identification information Dm1 and version information Dm2 of the map data M read in the step #22 with the section identification information Du1 and version information Du2 of the update data U read in the step #23, and extracts update data U having section identification information Du1 that matches the section identification information Dm1 of the map data M and an update version indicated by the version information Du2 that is later than the update version indicated by the version information Dm2 of the map data M from the recording medium R (step #24). In this example, the extraction processing portion 26 extracts the update data U corresponding to the shaded rectangular frames in FIG. 7. The update data U extraction processing of the step #24 will be described in detail below on the basis of the flowchart shown in FIG. 11. Next, the update processing portion 27 performs a differential update on the map data M by applying the update data U extracted in the step #24 to the map data M in the respective update subject sections. As a result, the update condition of the map data M stored in the map database DB1 shifts to the condition shown in FIG. 5. Note that this method of performing differential update processing on the map data M will be described in detail below on the basis of the flowchart shown in FIG. 12. The processing is terminated here.

6. Processing Method for Extracting Update Data from Recording Medium

Figure 11:
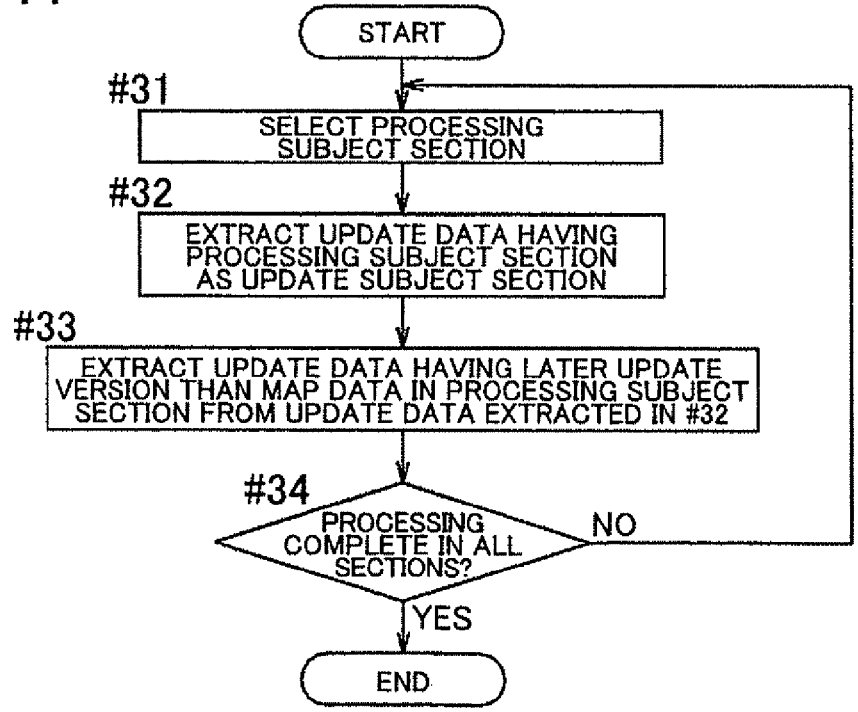
FIG. 11 is a flowchart showing a processing method for extracting the update data from the recording medium.

Next, the processing method of the step #24 in FIG. 10 for extracting the update data U from the recording medium R (recording medium) will be described. FIG. 11 is a flowchart illustrating this update data U extraction processing method. In this example, the condition of the update data U on the recording medium R is as shown in FIG. 7, and the update condition of the map data M in the map database DB1 of the navigation device 1 is as shown in FIG. 4.

As shown in FIG. 11, first, the extraction processing portion 26 of the navigation device 1 selects a processing subject section (step #31). Here, a single section to be subjected to extraction processing is selected from the plurality of sections p of the update data U stored on the recording medium R as the processing subject section. In this example, it is assumed that the sections A through G are selected one by one in sequence such that section A is first selected as the processing subject section. Next, the extraction processing portion 26 extracts the update data U having the processing subject section selected in the step #31 as an update subject section, or in other words, the update data U in which the section p indicated by the section identification information Du1 is the processing subject section (step #32). In this example, as shown in FIG. 7, two sets of update data U, i.e. update data U having the update versions "0512" and "0606", are stored on the recording medium R as the update data U having the processing subject section A as the update subject section, and therefore these two sets of update data U are extracted in the step #32.

Next, the extraction processing portion 26 extracts update data U having a later update version than the map data M in the processing subject section from the update data U extracted in the step #32 (step #34). In this example, as shown in FIG. 4, the update version of the map data M in the processing subject section A is "0512", and therefore the update data U having the update version "0606" are extracted in the step #34, as indicated by the shaded rectangular frame in FIG. 7. Thus, one set of update data U having the update version "0606" and for updating the section A is extracted.

Next, the extraction processing portion 26 determines whether or not the processing described above has been completed for all of the sections p (step #34). Until the processing described above has been completed for all of the sections p (step #34: No), the extraction processing portion returns to the step #31 and performs similar processing repeatedly, using the next section p as the processing subject section. In this example, the section 13 is selected next as the processing subject section in the step #31. In the step #32, two sets of update data U having the update versions "0512" and "0606" are extracted as the update data U for updating the section B (see FIG. 7). Next, in the step #33, the update data U having a later update version than the map data M in the processing subject section are extracted from the update data U extracted in the step #32. In this example, however, as shown in FIG. 4, the update version of the map data M in the section B is "0612", and therefore no update data U are extracted in the step #33. Accordingly, update data U for updating the section B are not extracted. Similar processing is repeated thereafter, whereby the plurality of update data U indicated by the shaded rectangular frames in FIG. 7 are extracted. When the processing described above has been completed for all of the sections p (step #34: Yes), or in terms of this example when the processing of the steps #31 to #33 has been completed on the section G, the processing to extract the update data U from the recording medium R (recording medium) is terminated.

Note that in the processing for extracting the update data U from the update database DB2, which is performed by the extraction processing portion 33 of the server device 3, the sections p that serve as the processing subject sections of the step #31 are selected from among the request sections of the distribution request data rather than being all of the sections p of the update data U stored on the recording medium R. Otherwise, the processing method is identical to that described above.

7. Processing Method for Performing Differential Update on Map Data

Figure 12:
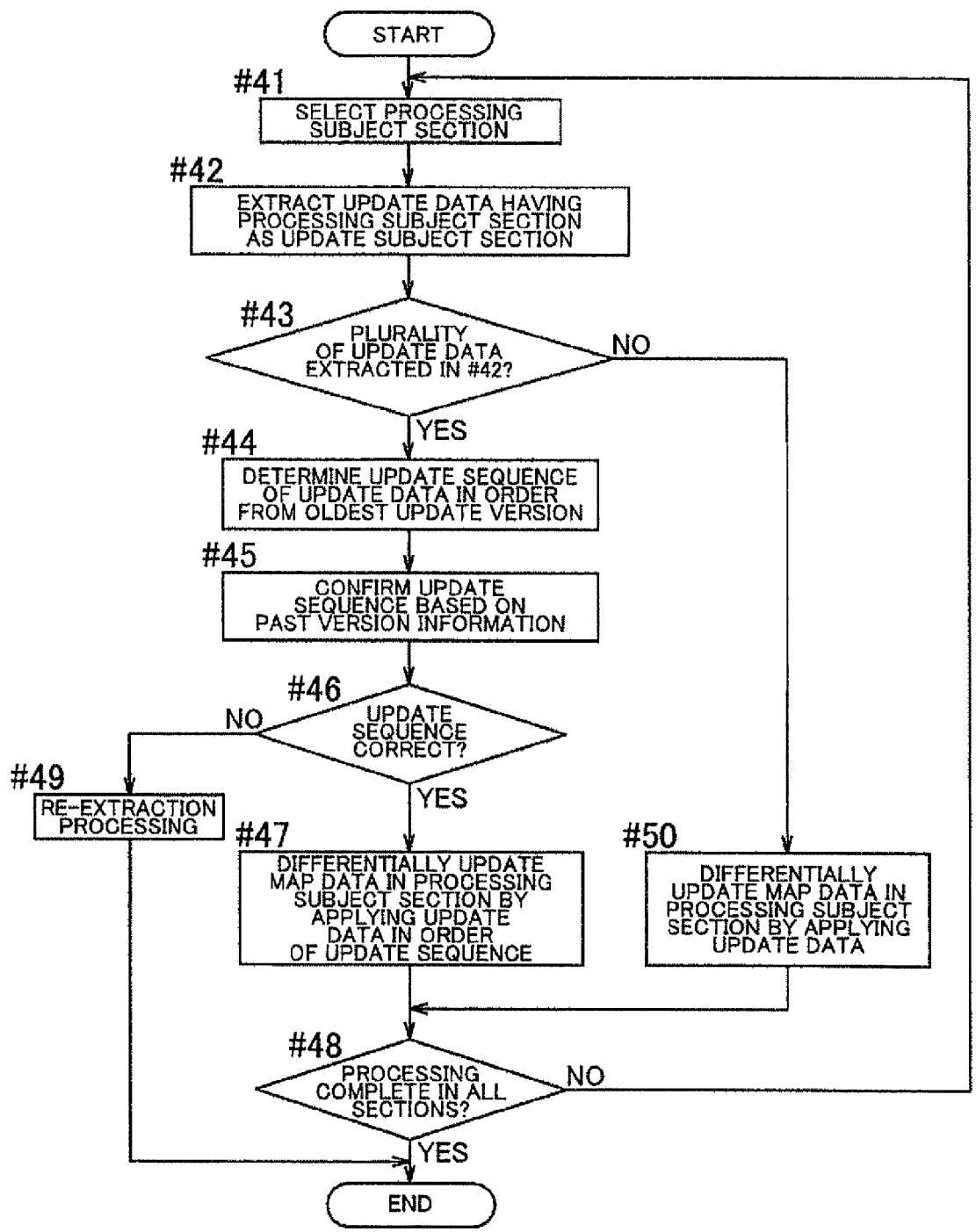
FIG. 12 is a flowchart showing a processing method for differentially updating the map data.

Next, a processing method for performing a differential update on the map data M stored in the map database DB1 will be described. FIG. 12 is a flowchart illustrating this map data M differential update processing method. In this example, a case in which the update data U extracted from the recording medium R in the step #24 of FIG. 10 correspond to the plurality of update data U indicated by the shaded rectangular frames in FIG. 7 and a differential update is performed on the map data M using these update data U such that the update condition of the map data M in the map database DB1 of the navigation device 1 shifts from the condition shown in FIG. 4 to the condition shown in FIG. 5 will be described.

As shown in FIG. 12, first, the update processing portion 27 of the navigation device 1 selects a processing subject section (step 441). Here, a single section to be subjected to differential update processing is selected from the update subject sections including the one or more sets of update data U extracted from the recording medium R in the step #24 of FIG. 10. In this example, one section at a time is selected in sequence from the sections A, D, E, F and G, excluding the sections B and C from which the update data U were not extracted. It is assumed here that the section A is first selected as the processing subject section. Next, the update processing portion 27 extracts the update data U having the processing subject section selected in the step #41 as the update subject section, or in other words the update data U in which the section p indicated by the section identification information Du1 is the processing subject section, from the plurality of update data U extracted from the recording medium R (step #42). In this example, as shown in FIG. 7, the update data U having the update version "0606" are extracted from the recording medium R as the update data U having the section A as the update subject section, and therefore this single set of update data U is extracted in the step #42.

Next, the update processing portion 27 determines whether or not a plurality of sets of update data U were extracted in the step #42 (step #43). When a single set of update data U is extracted in the step #42 (step #43: No), the update processing portion 27 performs a differential update on the map data M in the processing subject section by applying the extracted update data U (step #50). In this example, as described above, the single set of update data U having the section A, i.e. the processing subject section, as the update subject section and having the update version "0606" is extracted in the step #42. Accordingly, the update processing portion 27 performs a differential update by applying the update data U having the section A as the update subject section and having the update version "0606" to the map data M of the section A. Next, the update processing portion 27 determines whether or not the processing described above has been completed for all of the sections p (step #48). Until the processing described above has been completed for all of the sections p (step #48: No), the extraction processing portion 27 returns to the step #41 and performs similar processing repeatedly, using the next section p as the processing subject section. In this example, the sections D, E, F and G are selected in sequence following the section A (step 441).

Next, a case in which the section F is selected as the processing subject section in the step #41 will be described as an example of a case in which a plurality of sets of update data U are extracted in the step #42. In this case, as shown in FIG. 7, three sets of update data U having the update versions "0511", "0603" and "0609" are extracted in the step #42 as the update data U having the section F as the update subject section. Hence, this corresponds to a case in which a plurality of sets of update data U are extracted in the step #42 (step #43: Yes). Next, the update processing portion 27 determines the update sequence of the update data U in order from the oldest update version (step #44). In this example, the update sequence of the update data U is determined in order of the update versions "0511", "0603", "0609".

Next, the update processing portion 27 performs processing to confirm that the update sequence is correct on the basis of the past version information Du3 (step #45). More specifically, in accordance with the update sequence determined in the step #44, the update processing portion 27 confirms that the past version information Du3 of the first set of update data U in the update sequence matches the current update version of the map data M in the processing subject section and confirms that the past version information Du3 of each of the subsequent sets of update data U in the update sequence matches the update version of the respective preceding sets of update data U in the update sequence. When matches are made for all of the sets of update data U, it can be confirmed that the update sequence determined in the step #44 is correct. In this example, the past version information Du3 of the three sets of update data U having the update versions "0511", "0603" and "0609" is "0504", "0511" and "0603", respectively. Hence, the update processing portion 27 first confirms that the past version information Du3 "0504" of the update data U having the update version "0511", i.e. the first set of update data U in the update sequence, matches the current update version "0504" of the map data M in the processing subject section. Further, the update processing portion 27 confirms that the past version information Du3 "0511", "0603" of the two sets of update data U having the update versions "0603", "0609", i.e. the second and third sets of update data U in the update sequence, respectively match the update versions "0511", "0603" of the respective preceding sets of update data U in the update sequence. In this example, the update versions of the map data M and all of the update data U match the past version information Du3, and therefore the update sequence is confirmed to be correct.

When, as a result of the step #45, the update sequence is confirmed to be correct (step #46: Yes), the update processing portion 27 performs a differential update on the map data M in the processing subject section by applying the update data U sequentially in accordance with the update sequence determined in the step #44 (step #47). In this example, first, a differential update is performed by applying the update data U having the update version "0511" to the map data M in the section F, which has the update version "0504" in FIG. 4. Next, a differential update is performed by applying the update data U having the update version "0603" to the map data M in the section F, which now has the update version "0511" as a result of the first differential update, and finally, a differential update is performed by applying the update data U having the update version "0609". As a result, the update version of the map data M in the section F becomes "0609". When the processing described above has been completed on all of the sections p (step #48: Yes), differential update processing of the map data M is terminated.

On the other hand, when the update sequence is found to be incorrect as a result of the step #45 (step #46: No), the update processing portion 27 performs re-extraction processing of the update data U (step #49). More specifically, the update processing portion 27 outputs a processing command for extracting the update data U of the processing subject section when the update sequence is determined to be incorrect to the extraction processing portion 26. Accordingly, the extraction processing portion 26 performs processing to re-extract the update data U from the recording medium R with respect to the processing subject section. In this case, differential update processing of the map data M by the update processing portion 27 is temporarily terminated.

As regards differential update processing of the map data M using the received update data U in a case where one or more sets of update data U are received from the server device 3 (step #05 in FIG. 9), the section p that serves as the processing subject section in the step #41 is selected from the update subject sections of the one or more sets of update data U received from the server device 3. Further, the re-extraction processing of the step #49 is performed by outputting the processing command for extracting the update data U of the processing subject section when the update sequence is determined to be incorrect to the distribution request processing portion 25 rather than the extraction processing portion 26. Otherwise, the processing methods are similar to those described above.

OTHER EMBODIMENTS (1) In the embodiment described above, an example in which the section p is used as the update unit of the map data M was described. However, this is only one example of the update unit of the map data M, and the map data M may be updated in other update units. For example, features such as roads and facilities may be used as the update unit of the map data M. Further, in relation to data used in a point search, the search genre, geographical area and so on are preferably used as the update unit of the map data M.

(2) In the embodiment described above, an example in which the update version is set to express the generation year and month of the update data U was described. However, the setting method of the update version is not limited thereto. For example, in another preferred embodiment relating to the generation time of the update data U, the update version is set to express the year, month and day or even the year, month, day, hour and minute. The update version may also be set to express both the generation time of the update data U and other information such as the section p of the update subject map data M. The update versions may also be consecutive numbers relating to the respective sets of update subject map data M.

(3) In the embodiment described above, an example in which the update data U include the past version information Du3 was described. However, the update data U may be constituted not to include the past version information Du3. In this case, a table storing a sequence of update versions for each update subject section of the update data U may be provided in the server device 3 such that when the update data U are transmitted, the data in the table are transmitted together with the update data U. Alternatively, this table may be preferably stored on the master medium Rm serving as the source of the recording medium R together with the update data U. Further, when the update version is provided as a consecutive number for each update subject section of the update data U without relation to the generation time of the update data U, the sequence can be grasped easily on the basis of the update version, and therefore this type of table is not required.

(4) In the embodiment described above, the distribution sequence of the update data U when a plurality of update data U are extracted by the extraction processing portion 33 of the server device 3 on the basis of the distribution request data from the navigation device 1 was not described. However, in a preferred embodiment of the present invention, taking into consideration the fact that the communication condition may deteriorate during distribution, a distribution sequence may be determined in advance when distributing a plurality of update data U relating to a plurality of sections p to the navigation device 1 such that the update data U are distributed to the navigation device 1 in accordance with the distribution sequence. For example, when update data U relating to a plurality of sections p including the periphery of the current position, the periphery of the destination, and the periphery of a set route from the current position to the destination are distributed following the setting of a destination in the navigation device 1, a distribution sequence such as the following may be set. In this distribution sequence, the update data U may be distributed in order of the set route from the section p including the periphery of the current position toward the section p including the periphery of the destination. When the distribution sequence is set in this manner, the latest map of the periphery of the current position can be displayed on the display input device 13 even when communication is interrupted during distribution. Alternatively, the distribution sequence may be set such that the update data U are distributed in order of the set route from the section p including the periphery of the destination toward the section p including the periphery of the current position. When the distribution sequence is set in this manner, users can obtain the latest map information regarding the periphery of the destination even when communication is interrupted during distribution. Alternatively, the distribution sequence may be set such that the update data U relating to the section p including the periphery of the current position and thereafter, the section p including the periphery of the destination are distributed first, and the update data U relating to the sections p including the periphery of the set route are distributed. When the distribution sequence is set in this manner, due to low dependency on the update data U, route guidance is not affected greatly even when communication is interrupted during distribution, relating to the set route between the periphery of the current position and the periphery of the destination.

Here, the distribution sequence may be determined by the distribution portion 34 of the server device 3. Alternatively, the distribution sequence may be determined by the distribution request processing portion 25 of the navigation device 1. In this case, the distribution request processing portion 25 preferably includes request information relating to the distribution sequence in the generated distribution request data.

INDUSTRIAL APPLICABILITY

The present invention may be used in a navigation device that has a map database storing a plurality of map data divided into predetermined update units and is constituted to be capable of performing a differential update on the map data using update data, and in a map data updating method of the navigation device.

The invention claimed is:

1. A navigation device comprising:
a map database storing map data divided into predetermined update units, each update unit corresponding to a region obtained by dividing a map into a plurality of regions and each update unit respectively including identification information identifying the corresponding region and version information indicating a present update version;
receiving means for receiving, via a communication network, update data generated in update units corresponding to the update units of the map data, each generated unit of update data including difference information indicating an update content of the generated update data as a difference with the map data of the corresponding update unit stored in the map database, identification information identifying the corresponding region for the unit of update data, and version information indicating a post-update update version;
reading means for reading the update data from a recording medium storing a plurality of units of the update data; and
updating means for performing a differential update of the map data stored in the map database using the update data received by the receiving means or read by the reading means,
wherein, when performing an update of the map data using the update data stored on the recording medium, the updating means extracts the update data units having identification information that matches the identification information of the update units of map data stored in the map database and having version information indicating a later update version than the update version of the update units of map data stored in the map database from the plurality of units of the update data stored on the recording medium, and performs a differential update of the update units of map data using the extracted update data units.

2. The navigation device according to claim 1, wherein, when a plurality of update data units having the identification information that matches the identification information of the map data and having version information indicating a later update version than the update version of the map data exist, the updating means performs the differential update of the map data on the basis of the version information of the respective update data units such that the update data is applied in order from the update data unit having the oldest update version.

3. The navigation device according to claim 2, wherein the version information of an update data unit indicates an identical update version in relation to a plurality of update data units generated at an identical generation time but having different update map data.

4. The navigation device according to claim 3, wherein, in addition to the version information, update data units include past version information indicating a past update version of the update data relating to the update map data.

5. The navigation device according to claim 2, wherein, in addition to the version information, update data units include past version information indicating a past update version of the update data relating to an update unit of map data stored in the map database.

6. The navigation device according to claim 2, wherein the recording medium stores update data for a plurality of map data update units included in a predetermined geographical area as update subjects in all update versions generated within a predetermined time period.

7. The navigation device according to claim 1, wherein the version information of an update data unit indicates an identical update version in relation to a plurality of update data units generated at an identical generation time but having different update map data.

8. The navigation device according to claim 7, wherein, in addition to the version information, update data units include past version information indicating a past update version of the update data relating to an update unit of map data stored in the map database.

9. The navigation device according to claim 8, wherein the recording medium stores update data for a plurality of map data update units included in a predetermined geographical area as update subjects in all update versions generated within a predetermined time period.

10. The navigation device according to claim 7, wherein the recording medium stores update data for a plurality of map data update units included in a predetermined geographical area as update subjects in all update versions generated within a predetermined time period.

11. The navigation device according to claim 1, wherein, in addition to the version information, update data units include past version information indicating a past update version of the update data relating to an update unit of map data stored in the map database.

12. The navigation device according to claim 1, wherein the recording medium stores update data for a plurality of map data update units included in a predetermined geographical area as update subjects in all update versions generated within a predetermined time period.

13. A map data updating method for a navigation device, wherein, when a differential update is performed on map data using update data received via a communication network or read from a recording medium in a navigation device having a map database that stores map data divided into predetermined update units, each update unit corresponding to a region obtained by dividing a map into a plurality of regions and each update unit respectively including identification information identifying the corresponding region and version information indicating a present update version,
the update data are generated in update data units corresponding to the update units of the map data stored in the map database so as to include difference information indicating an update content of update subject map data as a difference with map data of the corresponding update unit stored in the map database, identification information identifying the corresponding region for the unit of update data, and version information indicating a post-update update version, and
when an update of the map data is performed by reading the update data from the recording medium storing a plurality of units of update data, the update data having identification information that matches the identification information of the update units of map data stored in the map database and having version information indicating a later update version than the update version of the update units of map data stored in the map database are extracted from the plurality of units of the update data stored on the recording medium, and a differential update of the update units of map data in the map database is performed using the extracted update data.

* * * * *